(12) United States Patent
Yoon et al.

(10) Patent No.: US 7,877,007 B2
(45) Date of Patent: Jan. 25, 2011

(54) OMNI-DIRECTIONAL STEREO CAMERA AND METHOD OF CONTROLLING THEREOF

(75) Inventors: Sukjune Yoon, Seoul (KR); Kyung Shik Roh, Seongnam-Si (KR); Woosup Han, Yongin-si (KR); Seung Ki Min, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 960 days.

(21) Appl. No.: 11/710,492

(22) Filed: Feb. 26, 2007

(65) Prior Publication Data

US 2007/0223911 A1 Sep. 27, 2007

(30) Foreign Application Priority Data

Mar. 23, 2006 (KR) ...................... 10-2006-0026516

(51) Int. Cl.
*G03B 35/00* (2006.01)
*G03B 41/00* (2006.01)
*G06K 9/00* (2006.01)

(52) U.S. Cl. .................. 396/325; 396/323; 396/333; 396/334; 348/36; 348/47; 382/154

(58) Field of Classification Search ................. 396/323, 396/325, 333, 334; 348/47, 36; 382/154
See application file for complete search history.

(56) References Cited

U.S. PATENT DOCUMENTS

| 6,304,285 | B1 | 10/2001 | Geng ........................ 345/36 |
| 6,313,865 | B1 | 11/2001 | Driscoll, Jr. et al. | |
| 2006/0187305 | A1* | 8/2006 | Trivedi et al. ............... 348/169 |

FOREIGN PATENT DOCUMENTS

| EP | 1 580 986 | 9/2005 |
| KR | 10-0491271 | 5/2005 |
| WO | WO 01/68540 | 9/2001 |
| WO | WO 02/35831 A1 | 5/2002 |

OTHER PUBLICATIONS

Extended European Search Report, mailed Mar. 16, 2007 and issued in corresponding European Patent Application No. 06122546.2-2202.

* cited by examiner

*Primary Examiner*—Rochelle-Ann J Blackman
(74) *Attorney, Agent, or Firm*—Staas & Halsey LLP

(57) ABSTRACT

An omni-directional stereo camera and a control method thereof. The omni-directional stereo camera includes two or more omni-directional cameras, and a supporting member installed within a shooting range between the omni-directional cameras to interconnect the omni-directional cameras and including compensation patterns formed at the surfaces.

12 Claims, 11 Drawing Sheets

FIG.5
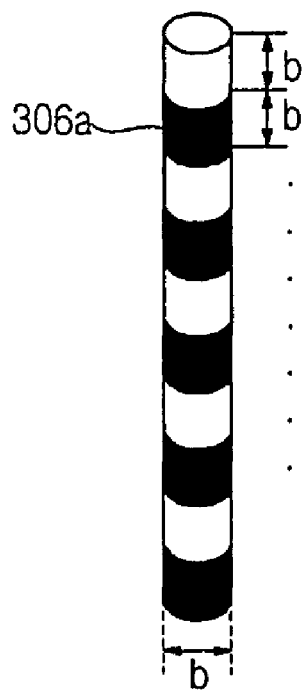 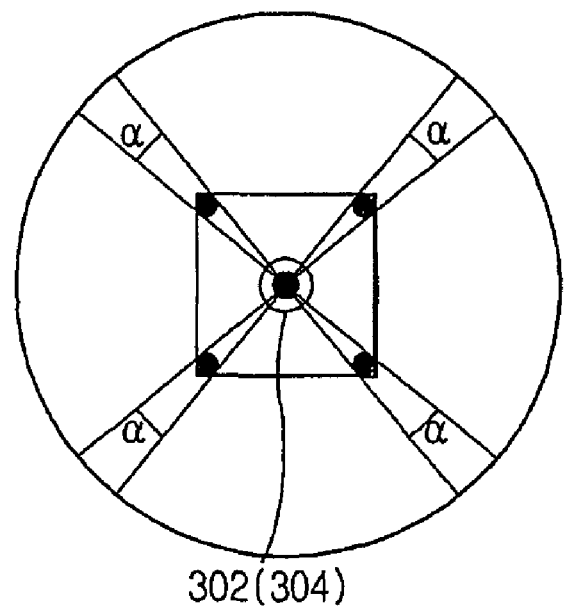
(A)　　　　　　　　　　　(B)

FIG.6
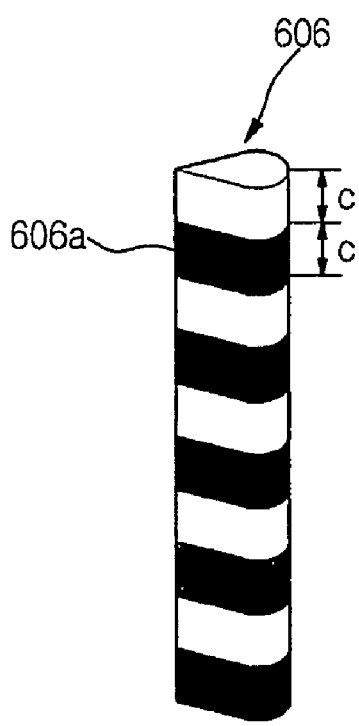
(A)
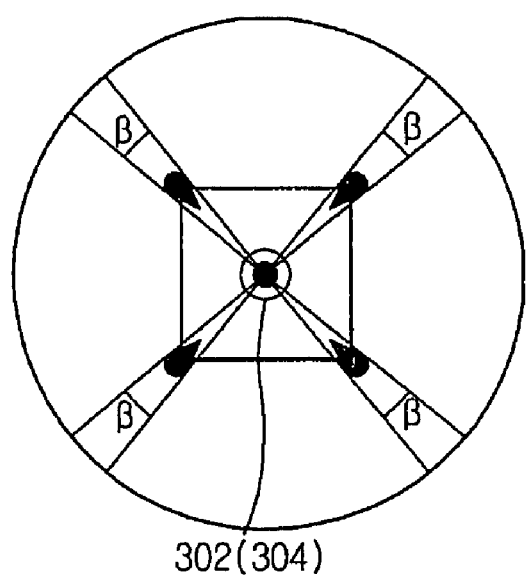
(B)

OMNI-DIRECTIONAL STEREO CAMERA AND METHOD OF CONTROLLING THEREOF

CROSS-REFERENCE TO RELATED APPLICATIONS

This application claims the benefit of Korean Patent Application No. 10-2006-0026516, filed on Mar. 23, 2006, in the Korean Intellectual Property Office, the disclosure of which is incorporated herein by reference.

BACKGROUND OF THE INVENTION

1. Field of the Invention

The present invention relates to a camera, and more particularly, to an omni-directional stereo camera for making a panoramic image, and a control method thereof.

2. Description of the Related Art

In various business offices such as buildings, banks, apartments or the like, the surroundings, parking areas, or the like are used by the by the public. In these areas, a closed circuit TV (CCTV) is installed to monitor the areas and to secure the safety of the public. A conventional monitor camera employed in the CCTV can capture an image of a very restricted area within a predetermined angle of view. Thus, if it is desired to capture and monitor the restricted area along with a wider area, it is necessary to install a greater number of cameras. However, by doing so, costs for installing the cameras and time for installation both increase.

A panoramic camera can capture a wider area because this device has a wider viewing angle than that of a general camera. However, the function of the panoramic camera is also restricted because this camera unable to capture an image in all directions, i.e. 360 degrees. In order to improve the angle of view, an omni-directional camera for capturing an image in all directions, i.e. 360 degrees, is used. The omni-directional camera can take a photograph of the surroundings of the camera in a complete 360 degree view. Thus, since the omni-directional camera can take a photograph in almost every direction except for a concealed place, even when a single omni-directional camera is installed, the omni-directional camera is very useful as a monitor camera.

FIG. 1 is a view illustrating a conventional single viewpoint omni-directional camera. As shown in FIG. 1, the conventional omni-directional camera is designed such that light reflected by a mirror 102 is projected to an image forming surface of an image sensor 104. In other words, a light at a certain position X in space is reflected from a position Xmir of the mirror 102 having a parabola-shaped surface and is projected to a position Ximg on the image sensor 104. Like this, light from a large portion of positions adjacent to the mirror 102 is reflected by the surface of the mirror 102 and is projected to the image forming surface of the image sensor 104 so that the image sensor 104 combines the projected light to form a distorted circular omni-directional image projected onto the mirror 102. The omni-directional image is compensated by an image processor and is transformed into a perfect 360 degree panoramic image.

An omni-directional camera, which has a single point Omir in the mirror 102 at which all incident lights concentrate, is called a single viewpoint (SVP) omni-directional camera. Otherwise, an omni-direction camera, which has more than two points Omir at which incident lights of the mirror 102 concentrate, is called a non-SVP omni-directional camera. Since it is very difficult to actually implement the SVP omni-directional camera because of restrictions such as design, the angle of view, or the like, the non-SVP omni-directional camera, which is relatively easily implemented, is mainly used.

The SVP omni-directional camera takes a photograph of a plane style compensation pattern positioned in a space to obtain an image difference for obtaining the image difference between a distorted omni-directional image and a compensated complete panoramic image and to apply the image difference to the compensation. However, the non-SVP omni-directional camera must obtain a required image difference for the compensation after positioning a cylindrical compensation pattern at the surroundings of the non-SVP omni-directional camera.

FIG. 2 is a view illustrating the compensation using a space pattern carried out in the non-single viewpoint omni-directional camera. As shown in FIG. 2, a cylindrical compensator 202 on which uniform patterns are pictured is positioned around the camera to extract the distorted omni-directional image. Thus, in order to compensate the non-SVP omni-directional camera, the camera must be moved to the place where the compensator 202 is installed, or the compensator 202 must be moved to a place where the camera is installed. Since the movement and the installation is required in all cases, this camera is very inconvenient. Particularly, if the camera is installed at a very high place or an inconvenient place which a user or a manager has difficulty accessing, the inconvenience is further increased.

SUMMARY OF THE INVENTION

Accordingly, it is an aspect of the present invention to provide an omni-directional camera integrally formed with a compensator to easily perform compensation.

It is another aspect of the present invention to provide an omni-directional stereo camera including two omni-directional cameras in which two compensating cameras are mechanically connected to each other using a supporting member on which compensation patterns are pictured.

It is still another aspect of the present invention to provide an omni-directional camera including a signal line that must be employed in the omni-directional camera and that penetrates a supporting member to prevent the signal line from being contained in an image.

Additional aspects and/or advantages of the invention will be set forth in part in the description which follows and, in part, will be apparent from the description, or may be learned by practice of the invention.

The forgoing and/or additional aspects are achieved by providing an omni-directional stereo camera including two or more omni-directional cameras, and a supporting member installed within a shooting range between the omni-directional cameras to interconnect the omni-directional cameras and including compensation patterns formed at the surfaces.

The omni-directional cameras are installed to face each other.

The supporting member has a narrow width and a long length when viewing from respective CCDs of the omni-directional cameras such that a dead angle is decreased and mechanical strength is increased.

Moreover, the supporting member includes a rod having a circular cross-section. The supporting member includes a rod having a teardrop-shaped cross-section. The supporting member includes a rod having an oval cross-section. There may be two of the supporting members.

Moreover, a signal line transmitting an image signal generated from any one of the omni-directional cameras passes through inside the supporting member to the other of the omni-directional cameras to prevent the signal line from occupying a portion of the image. Each of the omni-directional cameras includes a non-single viewpoint omni-directional camera.

The forgoing and/or other aspects are also achieved by providing a control method of an omni-directional stereo camera including two or more omni-directional cameras, and a supporting member installed within a shooting range between the omni-directional cameras to interconnect the omni-directional cameras and including compensation patterns formed at the surfaces thereof, the control method including transforming a circular omni-directional image obtained by the omni-directional cameras into a panoramic image using image information, and obtaining an image transformation algorithm and a three-dimensional coordinate estimating algorithm by assuming the respective omni-directional cameras to be independent projection cameras through the panoramic images captured by the respective omni-directional cameras.

BRIEF DESCRIPTION OF THE DRAWINGS

These and/or other aspects and advantages of the invention will become apparent and more readily appreciated from the following description of the embodiment, taken in conjunction with the accompanying drawings in which:

FIG. 5, parts A and B are views illustrating a supporting member of the omni-directional stereo camera of FIG. 3;

FIG. 6, parts A and B are views illustrating another supporting member of the omni-directional stereo camera of FIG. 3;

DETAILED DESCRIPTION OF THE PREFERRED EMBODIMENT

Figure 1:
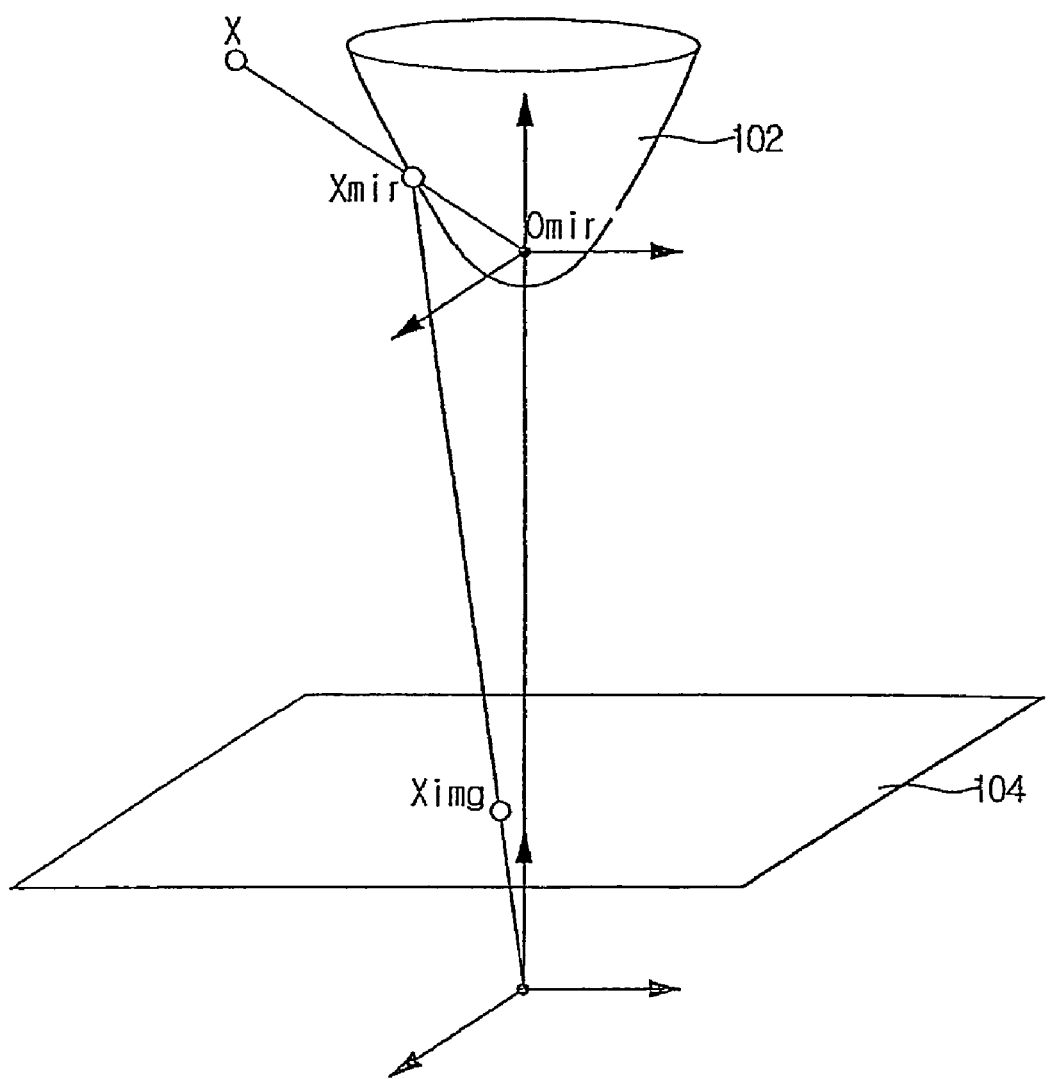
FIG. 1 is a view illustrating the concept of a conventional single viewpoint omni-directional camera.
Figure 2:
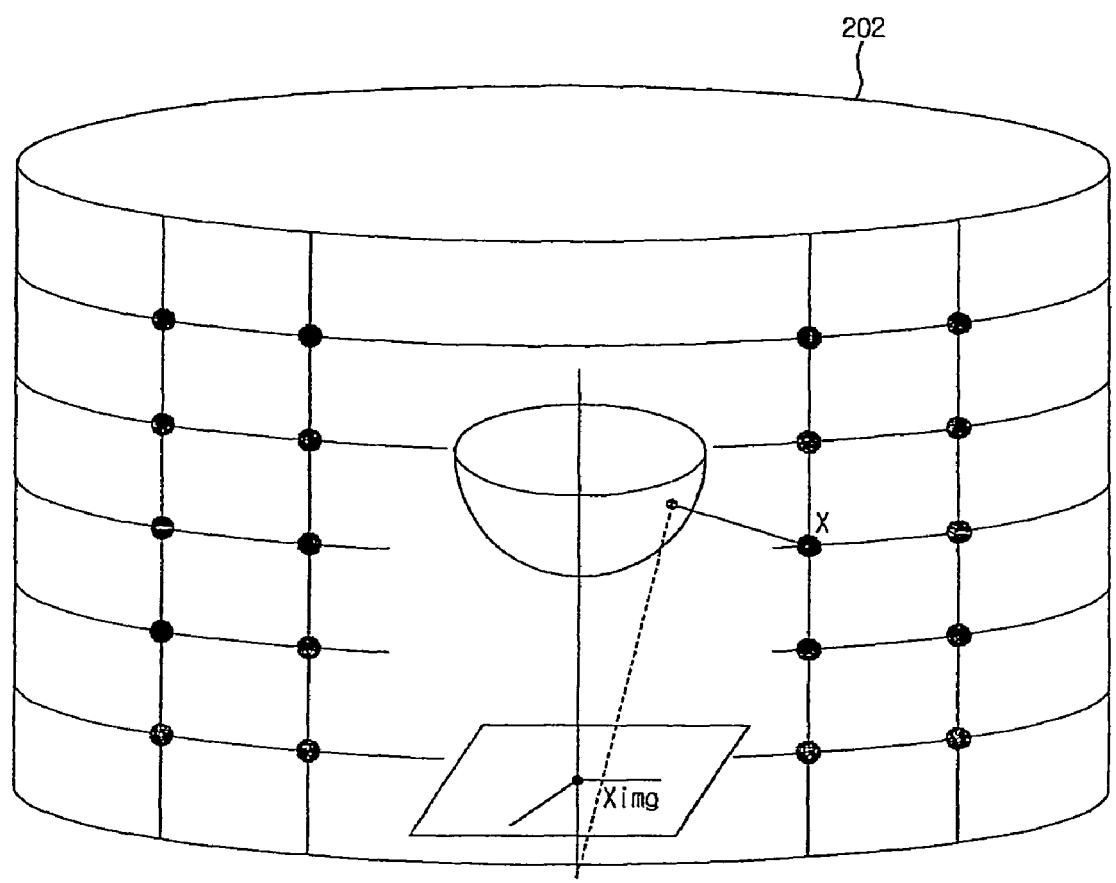
FIG. 2 is a view illustrating the compensation using a space pattern carried out in a non-single viewpoint omni-directional camera.

Reference will now be made in detail to the embodiment of the present invention, an example of which is illustrated in the accompanying drawings, wherein like reference numerals refer to the like elements throughout. The embodiment is described below to explain the present invention by referring to the figures.

Figure 3:
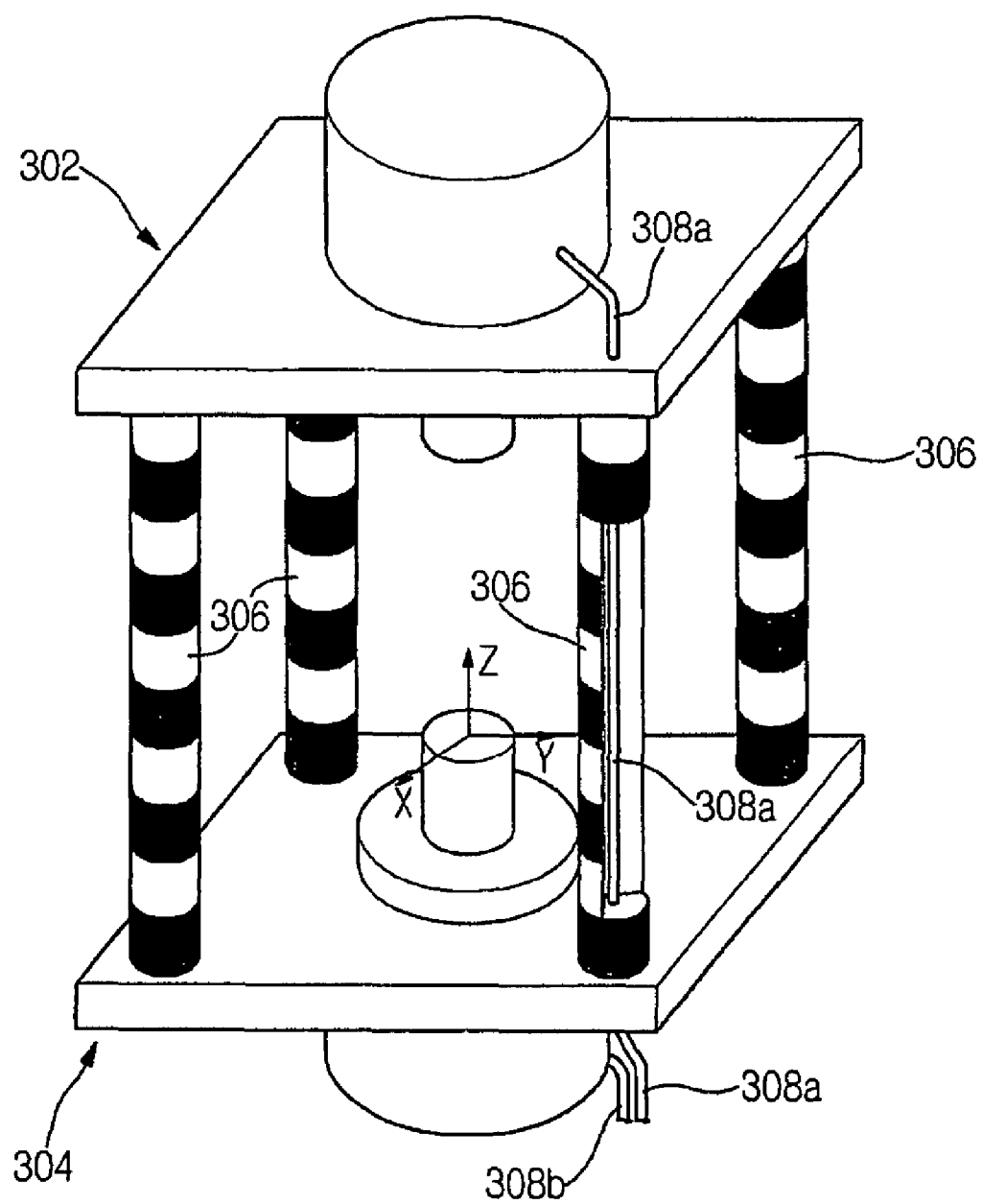
FIG. 3 is a view illustrating an omni-directional stereo camera according to an embodiment of the present invention.

FIG. 3 is a view illustrating an omni-directional stereo camera according to an embodiment of the present invention. As shown in FIG. 3, two omni-directional cameras 302 and 304 face each other and are mechanically connected to each other by four supporting members 306. Although four supporting members 306 are shown, fewer supporting members 306 (for example, two) may be provided, as long as the omni-directional cameras 302 and 304 are stably maintained. Although there is no maximum number of supporting members 306, it must be considered that the supporting members 306 may occupy an area of the image 306.

One of the four supporting members 306 has an inner space and a signal line 308a which penetrates the inner space. In order to couple two omni-directional cameras 302 and 304 into a single omni-directional stereo camera, omni-directional image signals generated by the two omni-directional cameras 302 and 304 are processed by a single image processor (not shown). To this end, any one of the signal lines of the two omni-directional cameras 302 and 304 must penetrate a place where the supporting members 306 are installed and arrive at another omni-directional camera. For this reason, the signal line must be contained in an angle of view and be reflected into an image so that a dead angle in a screen is increased. Since, in order to support the omni-directional stereo camera, the supporting members 306 coupling two omni-directional cameras into one are required, the dead angle caused by the supporting members 306 is inevitably generated. However, as shown in FIG. 3, when the signal line 308a penetrates the inner space of the supporting member 306, the dead angle can at least be prevented from being generated by the signal line 308a.

Figure 4:
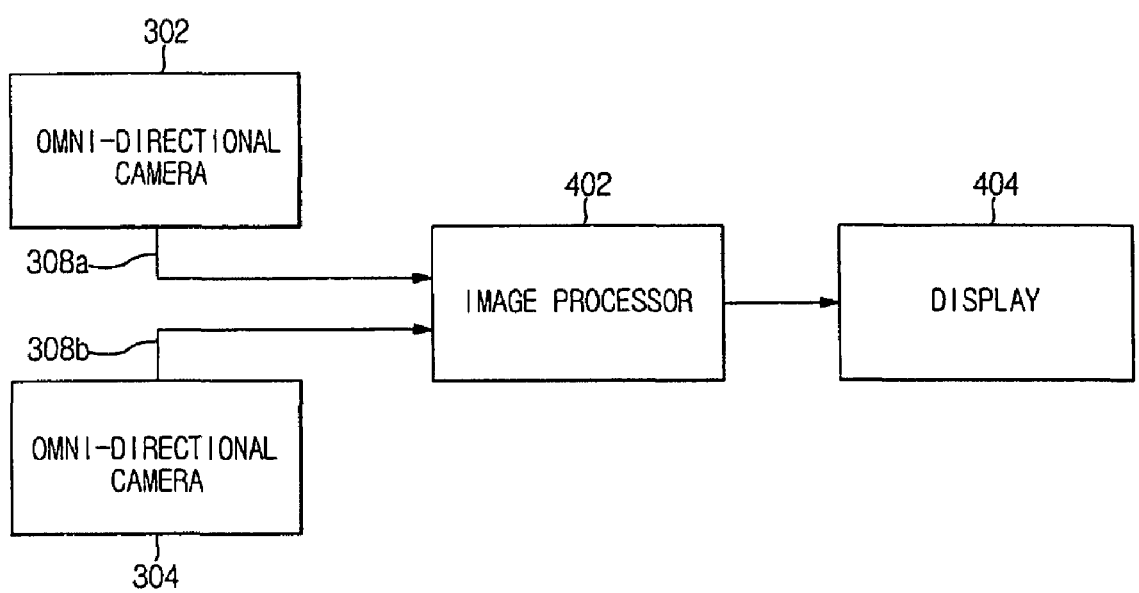
FIG. 4 is a view illustrating a control system of the omni-directional stereo camera of FIG. 3.

FIG. 4 is a view illustrating a control system of the omni-directional stereo camera in FIG. 3. As shown in FIG. 4, the omni-directional image signals obtained through two omni-directional cameras 302 and 304 are transmitted to the image processor 402 via the signal lines 308a and 308b, and the image processor 402 compensates the omni-directional signals to form complete images such that a display 404 displays the same. In this case, frames of the images obtained by the omni-directional cameras 302 and 304 are circular, and frames of the images compensated by the image processor 402 become rectangular panoramic images.

FIGS. 5A and 5B are views illustrating a supporting member of the omni-directional stereo camera in FIG. 3. As shown in FIG. 5A, the length of the supporting member 306 is determined using a cylindrical rod having a circular cross-section. The respective angles of view of the omni-directional cameras 302 and 304 must also be taken into consideration such that any one of the omni-directional cameras 302 and 304 does not interfere with an image captured by the other of the omni-directional cameras 302 and 304. Moreover, the surface of the supporting member 306 is patterned with a compensation pattern. The compensation pattern includes a plurality of bands 306a with a predetermined width b arranged in the same interval b as the width. A diameter of the supporting members 306 is equal to the length b of the compensation pattern.

FIG. 5B illustrates a dead angle α defined by the supporting members 306 and the size of the dead angle α is determined by the diameter b of the supporting members 306 and a distance from the omni-directional cameras 302 and 304. Thus, if possible, the diameter b of the supporting members 306 is decreased and the distance from the omni-directional cameras 302 and 304 is increased to decrease the dead angle α. However, if the distance from the omni-directional cameras 302 and 304 is excessively increased in order to reduce the dead angle α, the size of the omni-directional cameras 302 and 304 may be greater than the desired size, thus, it is effective to reduce the diameter of the supporting members 306. However, when taking mechanical strength between the omni-directional cameras 302 and 304 into consideration, the possible reduction in diameter restricted.

FIG. 6 is a view illustrating another supporting member of the omni-directional stereo camera of FIG. 3. A width of portions occupied by supporting members 606 in a screen is determined by a diameter c of the supporting members 606. A compensation pattern comprising a plurality of bands, 606a is provided. If the supporting members 606 have a teardrop-shaped cross-section, since the corner of the teardrop-shaped cross-section is contained in an arc-shaped image, a dead angle β is not influenced and mechanical strength greater than that of the circular cross-section is provided. In other words, although the diameter c of the supporting members 606 in FIG. 6 is smaller than that of the supporting members 306, the supporting members 306 in FIG. 5 have the same strength as that of the supporting members 606 in FIG. 6, and the dead angle β due to the supporting members 606 in FIG. 6 having a relatively small diameter becomes smaller than the dead angle α in FIG. 5.

In another case, any cross-section capable of increasing the mechanical strength and reducing the dead angle such as an oval cross-section, a rectangular cross-section, or the like, may be used.

Figure 7:
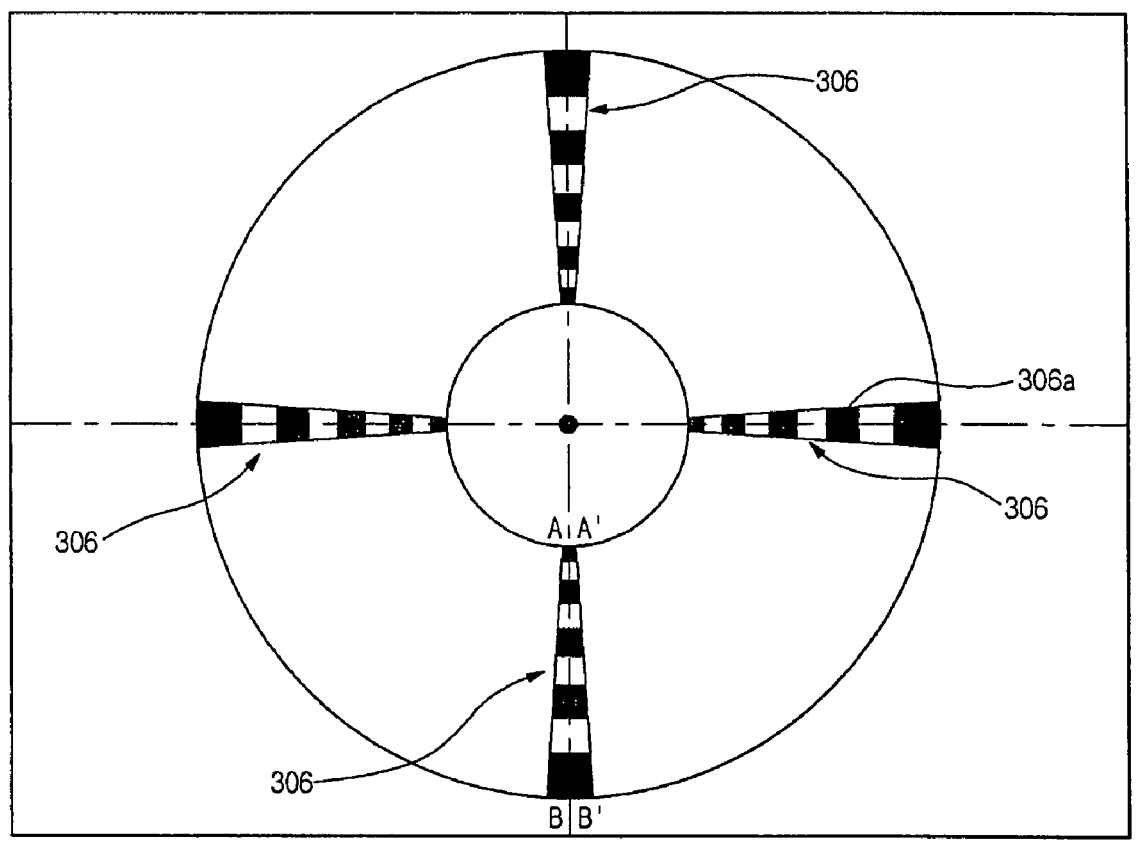
FIG. 7 is a view illustrating an uncompensated omni-directional image which is obtained from the omni-directional stereo camera of FIG. 3.

FIG. 7 is a view illustrating an uncompensated omni-directional image which is obtained from the omni-directional stereo camera of FIG. 3. As shown in FIG. 7, the uncompensated omni-directional image obtained from the omni-directional stereo cameras of FIG. 3 has a ring shape without an image in a circular central area. Actually, the more the compensation patterns of the supporting members 306 having a predetermined width and a regular interval go from the outer side to the center of the image, the smaller the interval and the width. The compensation of the omni-directional image is to transform the circular omni-directional image into a rectangular panoramic image, and to compensate the distortion of the width and the interval of the compensation patterns which are different from an actual image into the panoramic image as shown in FIG. 8, which will be described as follows.

Figure 8:
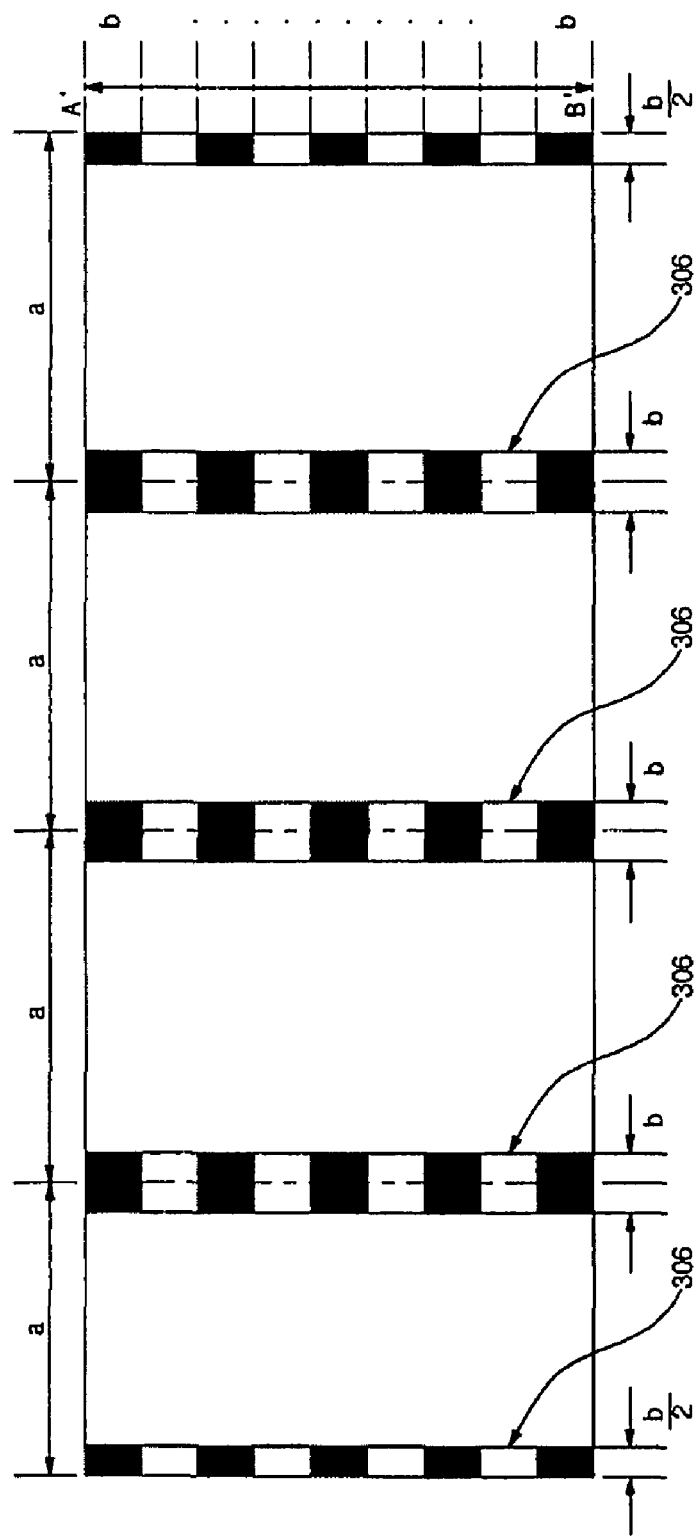
FIG. 8 is a view illustrating a compensated image in which an uncompensated image is transformed into a panoramic image.

FIG. 8 is a view illustrating a compensated image in which an uncompensated image is transformed into a panoramic image in which a portion AA'-BB' in FIG. 7 is cut and is transformed into the rectangular panoramic image through the compensation. When comparing the omni-directional image in FIG. 7 with the panoramic image in FIG. 8, the width and the interval of the compensation patterns of the supporting members 306 in the omni-directional image in FIG. 7 are decreased from the outer side to the center, different from the actual case, and are not uniform. However, even when the width and the interval of the compensation patterns of the supporting members 306 in the panoramic image in FIG. 8 are different from the actual case, at least the ratio of the width and the interval maintains the ratio of the actual case in FIG. 5A. In other words, since the width b and the interval b of the compensation patterns of the supporting members 306 in FIG. 5a are already known, how much the supporting members 306, in the omni-directional image, are distorted more than the actual case can be known. The distortion is compensated to obtain the complete panoramic image as shown in FIG. 8. During the above-process, degrees of the distortion of the omni-directional stereo camera according to the embodiment of the present invention are provided in the form of a look-up table, whereby an objective captured image is transformed with reference to values in the look-up table so that the complete panoramic image can be obtained. Particularly, using the look-up table instead of mathematical modeling using formulas, the amount of processing of the image processor is remarkably reduced so that the system load is also reduced and the processing speed of the image is significantly increased.

Figure 9:
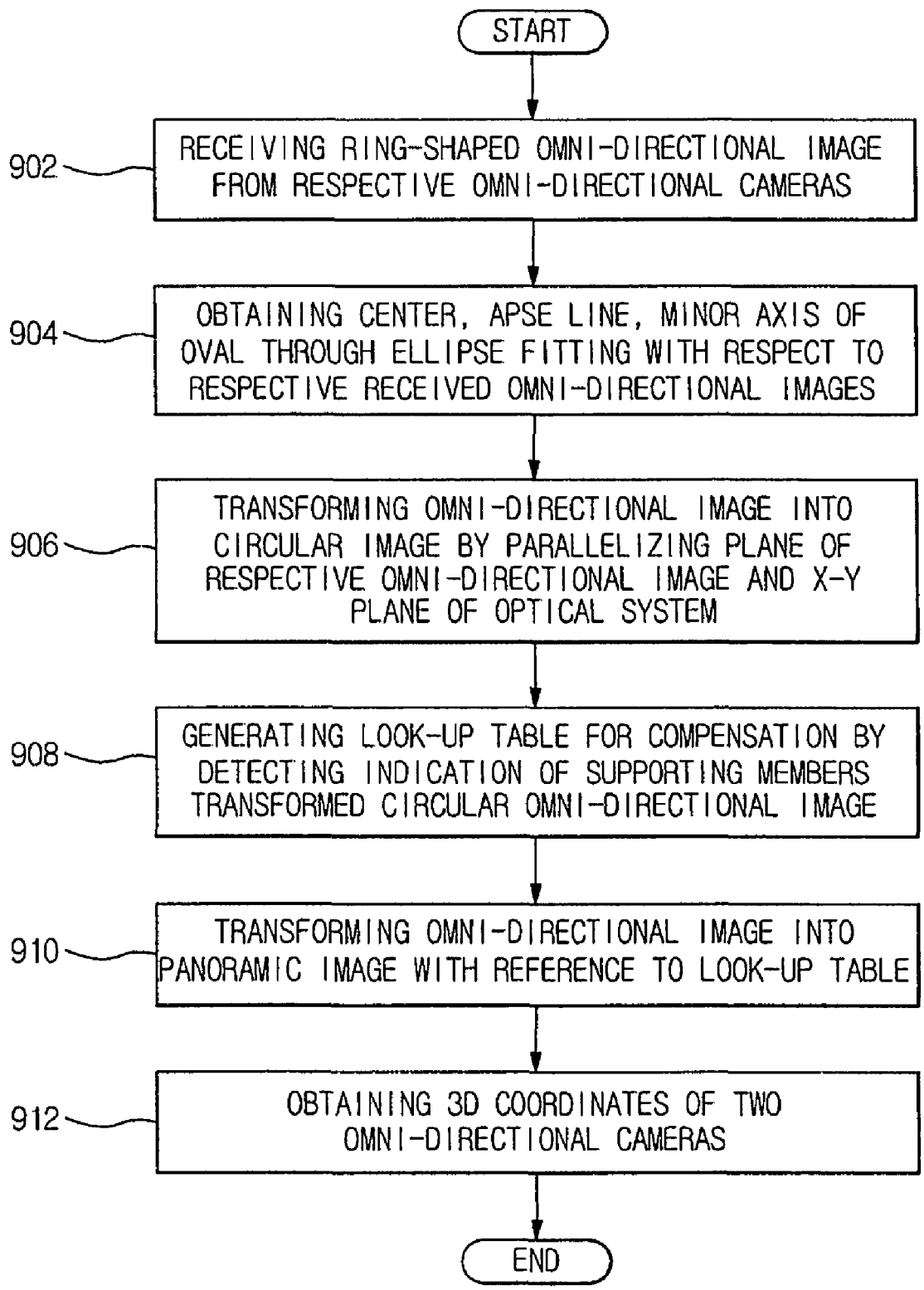
FIG. 9 is a view illustrating a control method of the omni-directional stereo camera according to the embodiment of the present invention.

FIG. 9 is a view illustrating a control method of the omni-directional stereo camera according to the embodiment of the present invention, which is carried out by the image processor 402 in FIG. 4. As shown in FIG. 9, the ring-shaped omni-directional image is received from the respective omni-directional cameras 302 and 304 (902). Since an image entered through a catadioptric system is an oval shape, ellipse fitting is carried out with respect to the received omni-directional images to obtain a center, an apse line, and a minor axis of the oval (904). Using the apse line and the minor axis, slopes of the coordinates of a CCD of an image sensor and the camera can be obtained. When the slopes are rotated about the rotation axis (the minor axis) of the oval, the X-Y plane of the coordinates of the CCD and the camera are parallel so that the omni-directional image is transformed from the oval shape into the circular ring shape (906).

The image processor 402 detects the supporting members 306 from the transformed circular omni-directional image, generates the look-up table for the compensation from the image information of the supporting members 306 (908), and transforms the omni-directional image into the panoramic image with reference to the look-up table in the same method as described with respect to FIG. 8 (910).

The omni-directional stereo camera takes a photograph using two omni-directional cameras, and an image transformation algorithm and a three-dimensional coordinate estimating algorithm are obtained by assuming the respective omni-directional cameras are independent projection cameras through the panoramic image captured by the respective omni-directional cameras (912).

Figure 10:
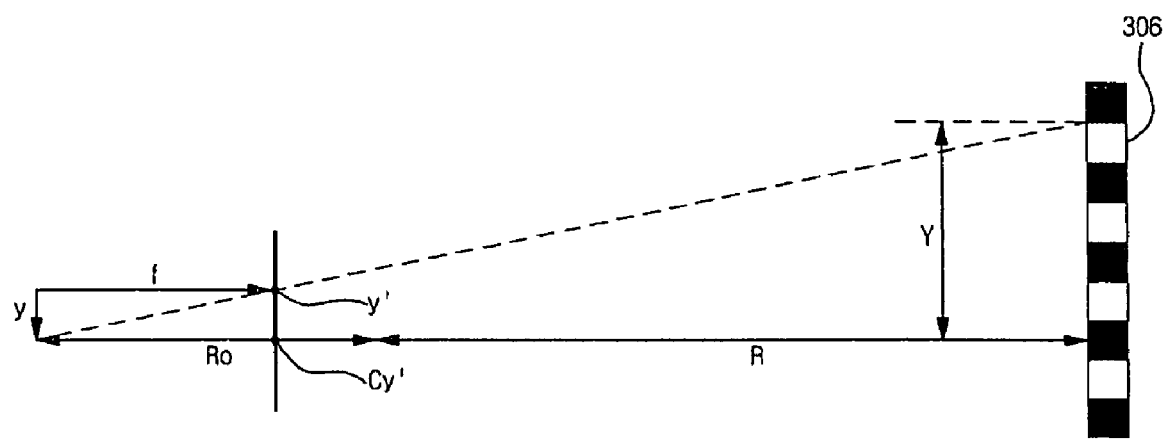
FIGS. 10 and 11 are views illustrating the concept of a three-dimensional coordinate being extracted from the omni-directional stereo camera of FIG. 3.
Figure 11:
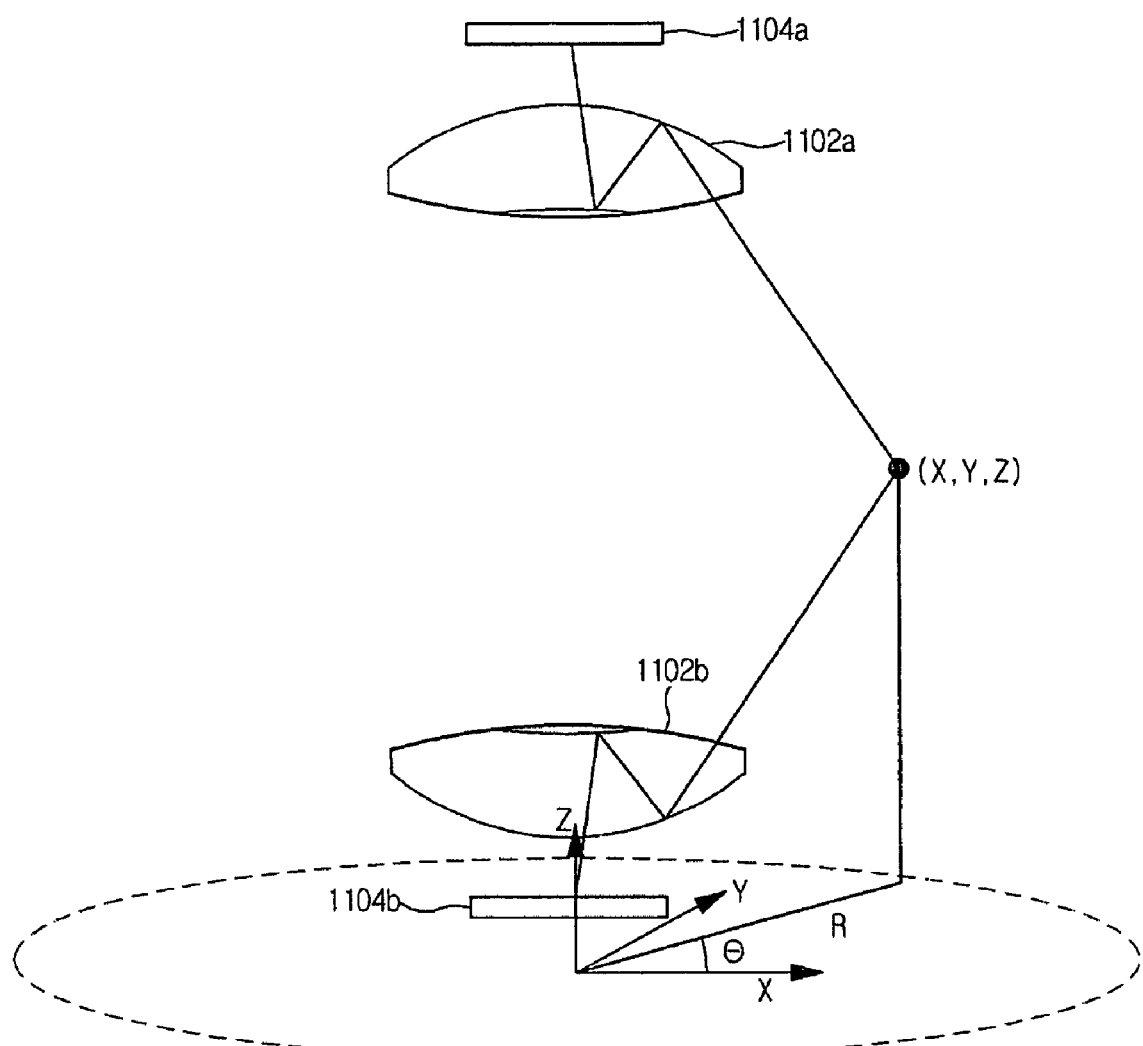

FIGS. 10 and 11 are views illustrating the concept of a three-dimensional coordinate extraction from the omni-direction stereo camera of FIG. 3. Particularly, FIG. 10 illustrates a Z-axis cross-section of the omni-directional camera. As shown in FIG. 1, as the omni-directional image is transformed into the panoramic image, the omni-directional cameras 302 and 304 can be assumed to be a conventional projection camera. Moreover, since two cameras are already compensated for, the CCDs of the cameras 302 and 304 are parallel to each other. Thus, the two omni-directional cameras 302 and 304 can be assumed to be a parallel stereo camera. In order to assume the parallel stereo camera, a virtual focal distance f of the panoramic image and a virtual depth offset Ro must be obtained. These values can be obtained from the formulas (1) to (3). Measurable values are y, Y, and R, and values to be obtained are f and Ro. Furthermore, y' represents a value of the actual measurement value Y that is focused at the virtual focal distance in a case when an omni-directional camera is modeled as a general projection camera. Moreover, Cy's represents a center of Y-axis when the omni-directional camera is modeled as the general projection camera.

$$y{:}f = Y{:}(R + Ro) \tag{1}$$

$$[Y - y] \cdot \begin{bmatrix} f \\ Ro \end{bmatrix} = [y \cdot R] \tag{2}$$

$$\begin{bmatrix} f \\ Ro \end{bmatrix} = A^+ \cdot B \tag{3}$$

$$\text{where } A = \begin{bmatrix} Y_1 - y_1 \\ Y_2 - y_2 \\ \vdots \\ Y_n - y_n \end{bmatrix}, \quad B = \begin{bmatrix} y_1 \cdot R_1 \\ y_2 \cdot R_2 \\ \vdots \\ y_n \cdot R_n \end{bmatrix}$$

When measuring several points in a space to be shot, the formula (3) can be obtained, the virtual focal distance f, the virtual vertical distance y, and the virtual depth offset Ro can be obtained from the formula (3) by a least mean square. When a stereo matching is carried out to the virtual focal distance f and the virtual depth offset Ro of the panoramic image obtained by the above method and the vertical direction of the two panoramic images, Y and R in FIG. 10 can be obtained. A+ is a pseudo-inverse of matrix A. Matrixes A+ and B must be obtained first in order to obtain the virtual focal distance f and the virtual depth off-set R0. Since f and R0 can be obtained to be insensible to error only when there are multiple values to obtain the matrixes A+ and B, pluralities of the measurement values Y (actual measurement), y (a value in an image), and R (actual measurement) are measured.

After obtaining R as described above, when a direction θ according to the x-coordinate of the panoramic image in FIG. 11 is obtained, a three-dimensional coordinate of a point assuming the lower omni-directional camera 304 as a reference point expressed by the formula (4) can be obtained.

$$X_L + R \cdot \cos(\text{Azimuth})$$

$$Y_L + R \cdot \sin(\text{Azimuth})$$

$$Z_L = Y \quad (4)$$

In FIG. 11, reference numerals 1102*a* and 1102*b* are assigned to lenses and reference numerals 1104*a* and 1104*b* are assigned to image sensors.

According to the embodiment of the present invention, the compensation device is installed in the omni-directional camera to easily perform the compensation.

Particularly, in the omni-directional stereo camera having two omni-directional cameras, two omni-directional cameras are interconnected using the supporting members having the compensation patterns so that the compensation is enabled without a separate compensation device.

Moreover, the signal line which must be included in the omni-directional camera passes inside the supporting member so that the signal line is not contained in the image.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An omni-directional stereo camera comprising:
   two or more omni-directional cameras; and
   a supporting member installed within a shooting range between the omni-directional cameras to interconnect the omni-directional cameras and including compensation patterns formed at surfaces thereof.

2. The omni-directional stereo camera according to claim 1, wherein the omni-directional cameras are installed to face each other.

3. The omni-directional stereo camera according to claim 1, wherein the omni-directional cameras each comprise a CCD and the supporting member has a narrow width and a long length when viewing from the respective CCDs of the omni-directional cameras such that a dead angle is decreased and mechanical strength is increased.

4. The omni-directional stereo camera according to claim 3, wherein the supporting member comprises a rod having a circular cross-section.

5. The omni-directional stereo camera according to claim 3, wherein the supporting member comprises a rod having a teardrop-shaped cross-section.

6. The omni-directional stereo camera according to claim 3, wherein the supporting member comprises a rod having an oval cross-section.

7. The omni-directional stereo camera according to claim 3, further comprising a plurality of the supporting members.

8. The omni-directional stereo camera according to claim 1, further comprising a signal line transmitting an image signal generated from one of the omni-directional cameras, wherein the signal line passes through an inside of the supporting member to the other of the omni-directional cameras to prevent the signal line from occupying a portion of the image.

9. The omni-directional stereo camera according to claim 1, wherein each of the omni-directional cameras comprises a non-single viewpoint omni-directional camera.

10. A control method of an omni-directional stereo camera comprising two or more omni-directional cameras, and a supporting member installed within a shooting range between the omni-directional cameras to interconnect the omni-directional cameras and including compensation patterns formed at surfaces thereof, the control method comprising:
    transforming a circular omni-directional image obtained by the omni-directional cameras into a panoramic image using image information; and
    obtaining an image transformation algorithm and a three-dimensional coordinate estimating algorithm by assuming the respective omni-directional cameras to be independent projection cameras through the panoramic image captured by the omni-directional cameras.

11. The omni-directional stereo camera according to claim 4, wherein a width of the compensation patterns is equal to a diameter of the rod.

12. The omni-directional stereo camera according to claim 1, wherein the compensation patterns comprise a plurality of bands.

* * * * *